J. B. GRIFFIN.

PERCOLATOR PUMP.

APPLICATION FILED MAY 18, 1916.

Reissued June 27, 1916. 14,157.

WITNESSES:

Wm. E. Blair

Louis Lucia

INVENTOR.

John B. Griffin:

BY

H. A. Hart.

his ATTORNEY.

UNITED STATES PATENT OFFICE.

JOHN B. GRIFFIN, OF NEW BRITAIN, CONNECTICUT, ASSIGNOR TO LANDERS, FRARY & CLARK, OF NEW BRITAIN, CONNECTICUT, A CORPORATION OF CONNECTICUT.

PERCOLATOR-PUMP.

14,157. Specification of Reissued Letters Patent. Reissued June 27, 1916.

Original No. 1,180,291, dated April 25, 1916, Serial No. 21,625. Application for reissue filed May 18, 1916. Serial No. 98,479.

*To all whom it may concern:*

Be it known that I, JOHN B. GRIFFIN, a citizen of the United States, residing at New Britain, county of Hartford, State of Connecticut, have invented a certain new and useful Improvement in Percolator-Pumps, and declare the following to be a full, clear, and exact description of the same, such as will enable others skilled in the art to which it pertains to make and use the same, reference being had to the accompanying drawings, which form a part of this specification.

My invention relates to percolator pumps and consists in the form of mounting of the valves therein which mounting is an improvement upon the construction shown in an application filed by me March 13, 1914, Serial Number 824,351. The construction in said application was such that the twin valves were pivoted upon a single pin, in such a manner that their weight acted to close the valves, the center of gravity of each valve being upon either side of the supporting point of the pin. This made a joint at the pin and made the valves operate somewhat rigidly, inasmuch as there was no special lost motion at the pin upon which they were supported and it also made them difficult to clean.

The object of my present invention is to avoid these difficulties and render the valve self-cleaning, although employing the same fundamental principle of gravity to close the valve. I accomplish this object by the mechanism hereinafter shown and described.

Figure 2:
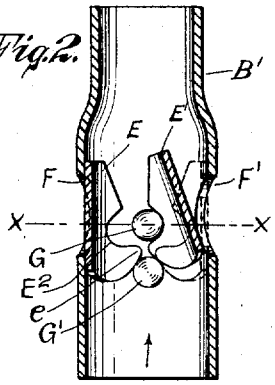
Figure 3:
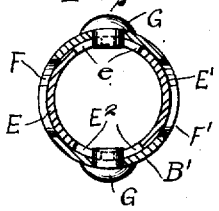
Figure 4:
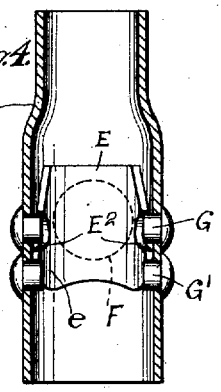
Figure 1:
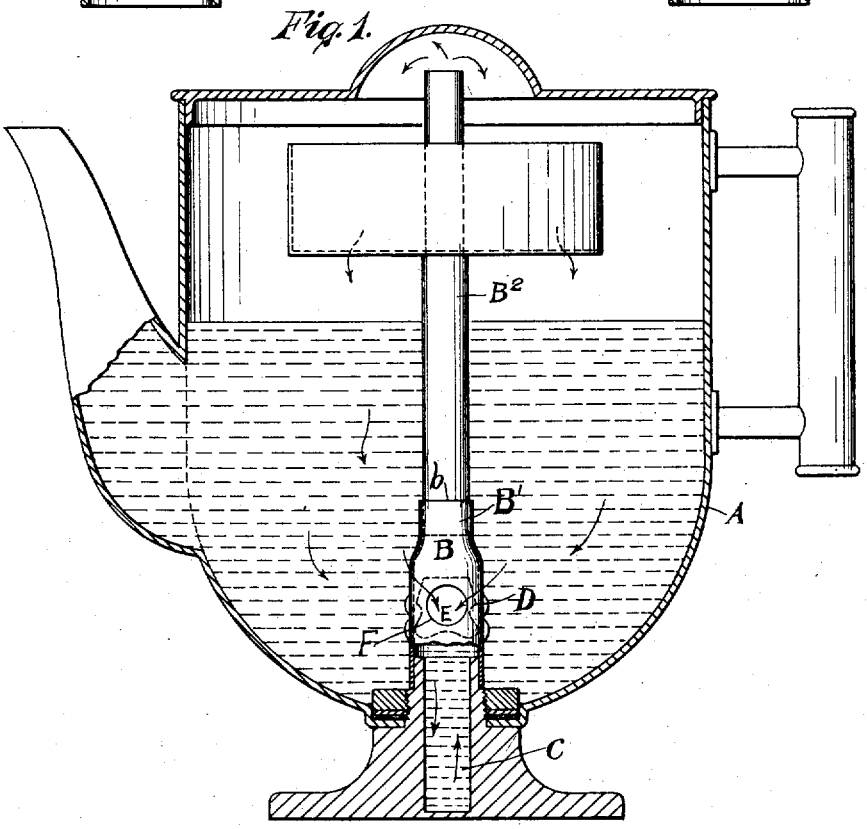

In the drawings—Figure 1, illustrates a coffee pot with a percolator pump in position showing the general action thereof. Fig. 2 is a vertical section at right angles to the supporting pins of the valve of the pump structure. Fig. 3, is a cross section of Fig. 2 on the line X—X. Fig. 4, is a vertical section at right angles to that of Fig. 2.

In the drawings, A represents the bowl of the coffee pot; B is the percolator pump, as a whole, divided however into two sections B′ and B² separable at *b* by a telescoping joint. A well C is below the valves of the pump which are inclosed and shown in dotted lines at D. As the general mode of operation is the same as in all percolator pumps and common thereto, it is not necessary to describe it in detail.

The valves E, E′ are shown and in Fig. 2 the valve E is shown closed over a perforation F, whereas the valve E′ is shown away from or opening the perforation F′. In actual operation the valves open and close simultaneously and not as shown in Fig. 2. They are shown in Fig. 2 in the manner described for the purpose of illustration, it being noted that the valve E′ is shown closed in dotted lines in said figure.

Upon each side of the casing B′ there is a pair of projecting spur studs or rivets G, G′ which extend inwardly through the wall B′ far enough to support the hollow internal valves E, E′, the rivet G being arranged above the rivet G′. The valves are peculiarly shaped, as shown in Fig. 2, the convex side closely fitting the wall B′, so that when against it, as shown at E, it practically closes the opening F so that it is liquid tight. Each side of the concavo-convex valves E, E′ is cut out with a notch at E². This notch enables the valves to fall inwardly against the projection of the rivet or stud G, as shown in the position of the valve E′. This permits the opening F′ to be utilized, but during the flow of liquid upwardly, shown by the arrow impinging upon the inner side of each valve, forces them, in addition to their weight, over against their opening and closes it as shown by the valve E. The valves are supported by the lower stud G′, the shell of the valve resting upon the projection of such stud or studs upon either side of the casing B′, as shown in Fig. 2 and Fig. 4. The two studs together with the projections *e*, *e* on the valves retain the valves in position. The withdrawal or removal of one of the studs, especially of the lower one G′, will permit the valves to be withdrawn from the casing B′. It will be seen by this structure that while the valves are held in position loosely, yet they are unable to be withdrawn or to drop out of position so long as the studs G, G′ are in place. It is further seen that there are no surfaces which are closed and kept in a closed position as joints in which sediment can collect, and it will further be seen that there are no pins crossing from side to side of the casing as shown in my former application.

What I claim is:

1. In a percolator pump, the combination of a vertical hollow member having an opening near its bottom, a valve for swinging over said opening to close the same by gravity, and means for providing a support upon which said valve may swing and for limiting the opening of the valve and preventing the valve becoming displaced, said means engaging only the outer edge of said valve.

2. In a percolator pump, the combination of a vertical hollow member provided with an orifice in its side, a valve arranged to swing closed by gravity and guard the said orifice, and two pairs of studs protruding through the walls of said vertical hollow member, the upper pair for limiting the opening movement and displacement of said valve, and the lower pair to provide a support upon which said valve may loosely swing, the said studs engaging the outer edges of said valve.

3. In a percolator pump, the combination of a vertical hollow member provided with an orifice in its side, a valve arranged to swing closed by gravity to guard said opening, and two pairs of removable studs projecting through the wall of the vertical hollow member, the upper pair of which engage the edge of the valve to prevent its displacement and to limit the opening movement of the valve, and the lower pair of removable studs being arranged to engage with the outer edge of said valve to form a support upon which the valve may swing.

4. In a percolator pump, the combination of a vertical hollow member provided with an orifice in its side, a valve arranged to swing closed by gravity and guard said orifice, and two pairs of short studs inserted a pair through each of two opposite sides of the vertical hollow member, the upper studs being arranged to engage with the edge of the valve to limit the opening movement and prevent the displacement of the valve, and the lower studs being arranged to engage the outer edge of the valve to form a support upon which the valve may swing.

5. In a percolator pump, the combination of a vertical hollow member provided with an orifice in its side, a valve arranged to swing closed by gravity to guard the said orifice and provided with a pair of notches in its outer edges, two pairs of studs arranged a pair on each side of the vertical hollow member and protruding through the same so that the upper members of the pairs are located to engage in the notches of the valve when the valve swings open, thereby to limit the opening movement of the valve and prevent its displacement, and the lower studs are located to form a support for the edge of the valve upon which the valve may swing.

6. In a percolator pump, a vertical tube provided with an orifice in its wall, supports below and at each side of said orifice substantially opposite one another, a closure for said orifice, extensions from the lower part thereof provided with rounded terminals resting on said supports.

7. In a percolator pump, a vertical tube provided with an orifice in its wall, supports below and at each side of said orifice substantially opposite one another, a closure for said orifice, extensions from the lower part thereof provided with rounded terminals resting on said supports, said extensions in part dropping below the top of said supports, to provide means for preventing the accidental displacement transversely of said supports.

8. In a percolator pump, a vertical tube provided with an orifice in its wall, diametrically opposite supports on the inner wall of said tube, a closure for said orifice, and oppositely disposed terminals on said closure lying against the wall of said tube, and carried by and having a rocking bearing on said supports.

JOHN B. GRIFFIN.

Copies of this patent may be obtained for five cents each, by addressing the "Commissioner of Patents, Washington, D. C."